United States Patent

[11] 3,603,154

[72] Inventor Virgil L. Frantz
  Salem, Va.
[21] Appl. No. 868,131
[22] Filed Oct. 21, 1969
[45] Patented Sept. 7, 1971
[73] Assignee Graham-White Sales Corporation
  Salem, Va.

[54] PRESSURE GAUGE ASSEMBLY
  10 Claims, 12 Drawing Figs.
[52] U.S. Cl. ..................................................... 73/420,
  141/383, 285/325
[51] Int. Cl. ..................................................... G01l 7/00
[50] Field of Search ........................................ 73/420,
  431; 285/325, 103, 67; 141/383

[56] References Cited
UNITED STATES PATENTS

| | | | |
|---|---|---|---|
| 868,931 | 10/1907 | Kuszmaul, Jr. ............... | 141/383 X |
| 1,842,462 | 1/1932 | Smith ........................... | 141/383 X |
| 1,911,099 | 5/1933 | White et al. ................... | 73/431 |
| 2,206,437 | 7/1940 | Tracy ............................ | 73/431 |
| 2,339,181 | 1/1944 | Martin........................... | 73/420 |
| 2,517,759 | 8/1950 | Bentzen......................... | 141/383 X |
| 2,958,219 | 11/1960 | McIntyre et al. ............. | 73/4 |
| 3,102,427 | 9/1963 | Trostel ......................... | 73/420 |
| 3,260,119 | 7/1966 | Jones............................. | 73/420 |
| 3,375,718 | 4/1968 | Robinson et al. ............. | 73/420 |

*Primary Examiner*—Louis R. Prince
*Assistant Examiner*—Daniel M. Yasich
*Attorney*—Wilmer Mechlin ABSTRACT: A pressure gauge assembly combining a pressure gauge for gauging one or more pressure lines and a mounting bracket to which the gauge is releasably clamped under spring pressure and locked against release except when relieved of line pressure. The gauge is both connectable to any pressure lines and testable through the bracket and fluid-connected thereto without pipe fittings, and the gauge case has a removable magnifying face plate formed of a glass lens molded in a plastic rim.

Inventor
Virgil L. Frantz
By Wilmer Mechlin
his Attorney

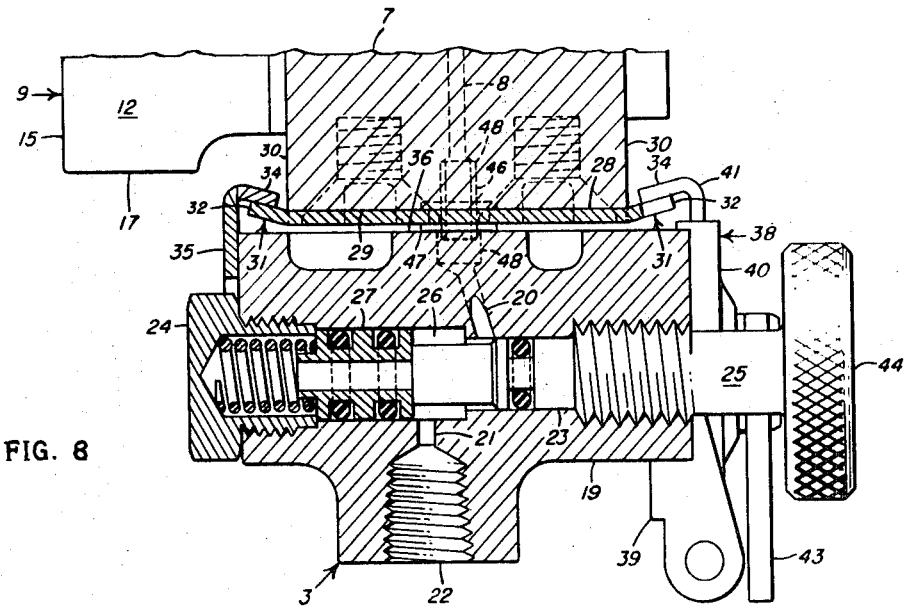
FIG. 8
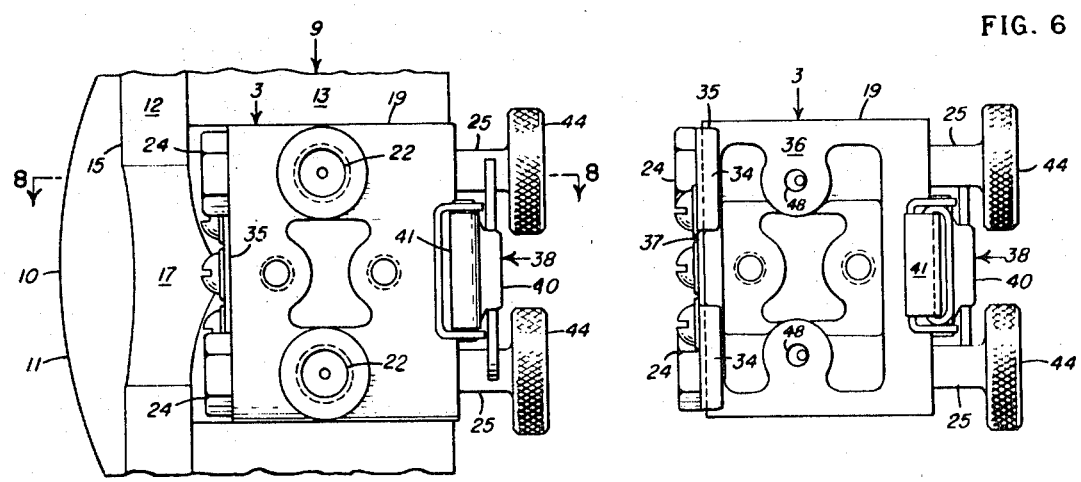
FIG. 4
FIG. 6
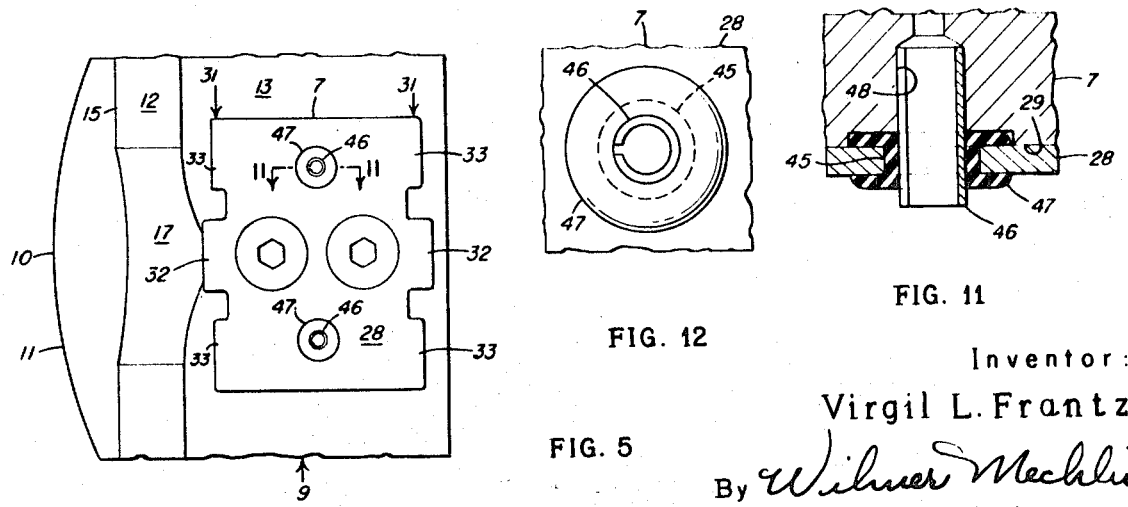
FIG. 5
FIG. 12
FIG. 11
Inventor:
Virgil L. Frantz
By Wilmer Mechlin
his Attorney PATENTED SEP 7 1971
3,603,154
SHEET 3 OF 3
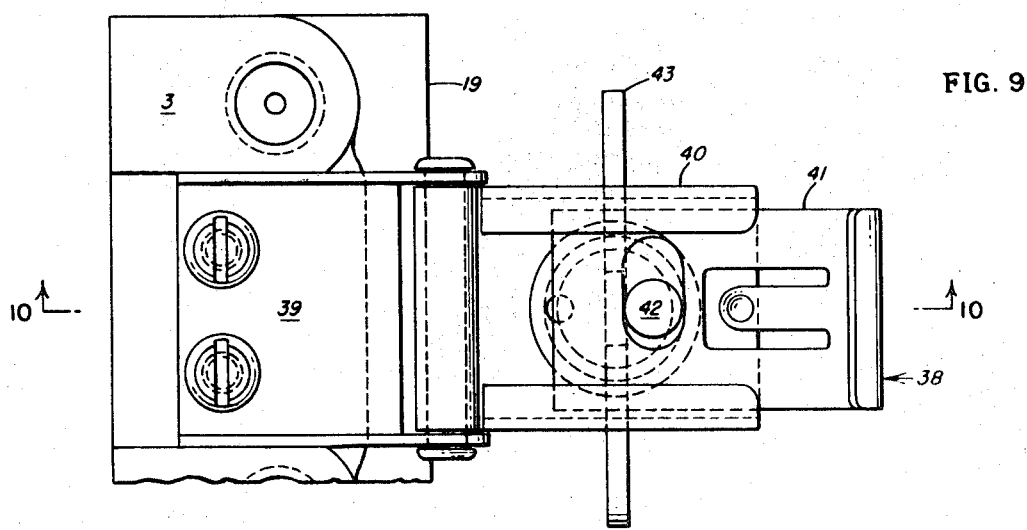
FIG. 9
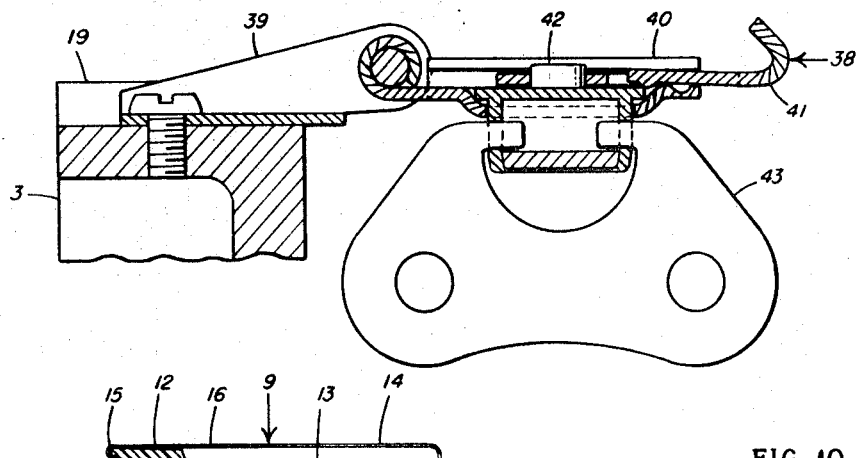
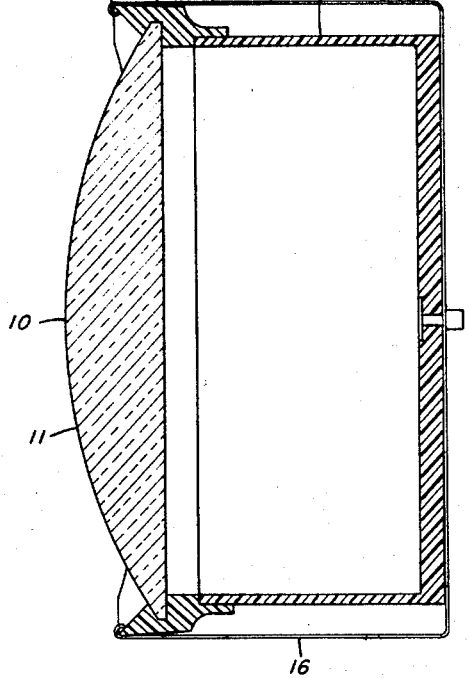
FIG. 10
FIG. 7
Inventor:
Virgil L. Frantz
By Wilmer Mechlin
his Attorney 3,603,154

PRESSURE GAUGE ASSEMBLY

BACKGROUND OF THE INVENTION

As in my copending application Ser. No. 767,631, filed Oct. 15, 1968, pressure gauge assemblies have heretofore been proposed which enable a gauge to be tested in place and also prevent its removal while open to any pressure line. However, in the prior assemblies a gauge has been removable only by individually uncoupling it from any line to which it is connected and, although desirable for permitting visual inspection of its operating parts, no prior gauge case has effectively combined transparency with undistorted magnification of the dial. It is with these problems that the present invention is particularly concerned.

SUMMARY OF THE INVENTION

The primary object of the present invention is to provide an improved pressure gauge assembly including a mounting bracket permanently connectable to one or more pressure lines to be gauge releasably clamped to the bracket, which has no pipe fittings between the bracket and the gauge and locks the gauge against unclamping and removal except when it is relieved of line pressure.

Another object of the invention is to provide an improved pressure gauge assembly of the character described wherein the mounting bracket also is adapted for connection thereto of a testing device for testing the gauge in situ and is particularly adapted for connecting a duplex gauge to a pair of pressure lines for simultaneous gauging thereof.

Among the features of the invention is a spring plate secured to a base of the gauge through which the gauge is both mechanically and fluid-connected to the mounting bracket. For the mechanical connection, the plate has counterpart sides which not only enable the gauge to be reversed in the direction of its mounting on the bracket but also permit the plate to be reversed on the gauge in case of a mechanical failure of either side. For each fluid connection, the preferred plate is apertured to receive a rollpin or other short connecting tube and a surrounding rubber or like grommet, the latter facing on both sides of the plate for sealing between bracket and the gauge and the former projecting beyond the grommet on both sides for positioning the gauge on the bracket during assembly, as well as passing fluid therebetween and holding the grommet and itself in place. Another feature is the provision for the case of the gauge of a magnifying face or cover plate formed of a glass lens molded in a breakage-resistant plastic rim of such configuration as to accept a spring clip for releasably holding the plate in place, while permitting a plurality of gauges to be mounted abreast with minimum clearance therebetween. Not only does it have such a cover plate, but the preferred case is itself made of transparent plastic, suitably "Lexan," for ready observation of the workings of the gauge.

Other objects and features of the invention will appear hereinafter in the detailed description, be particularly pointed out in the appended claims and be illustrated in the accompanying drawings, in which:

FIGURE DESCRIPTION

FIG. 4 is a fragmentary bottom plan view on an enlarged scale of one of the improved assemblies;

FIG. 5 is a bottom plan view of the assembly of FIG. 4 with mounting bracket removed;

FIG. 6 is a top plan view of the mounting bracket of FIG. 4 removed from the gauge;

FIG. 7 is a vertical sectional view on the scale of FIG. 4 of the case of one of the assemblies with the gauge removed, taken along lines 7—7 of FIG. 2;

FIG. 8 is a fragmentary vertical sectional view on an enlarged scale taken along lines 8—8 of FIG. 4;

FIG. 9 is a fragmentary end elevational view showing the clamp of FIG. 8 in open position;

FIG. 10 is a vertical sectional view taken along lines 10—10 of FIG. 9;

FIG. 11 is a vertical sectional view on a further enlarged scale, taken along lines 11—11 of FIG. 5; and FIG. 12 is a bottom plan view of the structure of FIG. 11.

DETAILED DESCRIPTION

Figure 1:
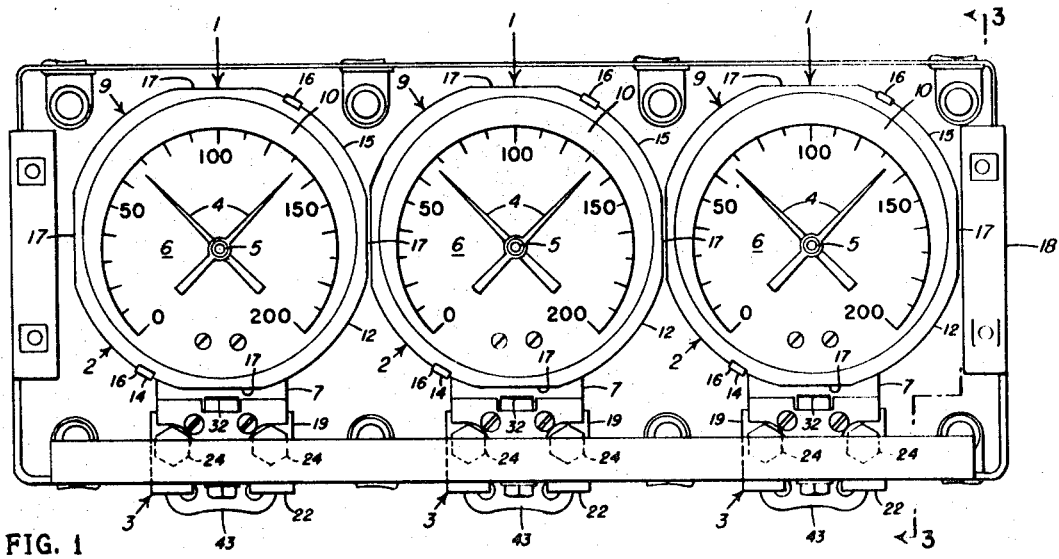
FIG. 1 is a front elevational view of a plurality of the improved gauge assemblies of the present invention mounted abreast in a panel.
Figure 2:
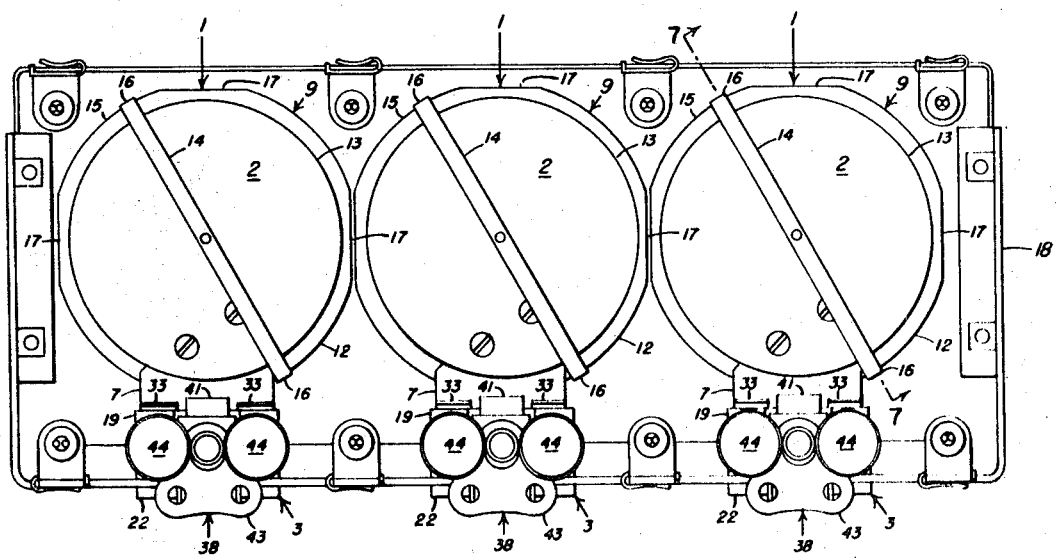
FIG. 2 is a rear elevational view of the structure of FIG. 1.
Figure 3:
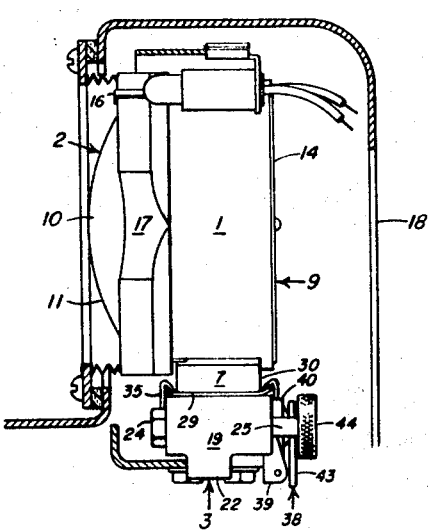
FIG. 3 is a vertical sectional view taken along lines 3—3 of FIG. 1.

Referring now in detail to the drawings in which like reference characters designate like parts, the improved pressure gauge assembly of the present invention, designated as 1, is adapted generally for gauging fluid pressure in any installation and particularly designed for installations, as in diesel locomotives, requiring periodic testing for accuracy.

The improved gauge assembly 1 is comprised of a pressure gauge 2 and a mounting bracket or mount 3 to which the gauge is releasably clamped. The gauge 2, of necessity, will have a pressure range suitable for the particular installation and ordinarily will be of the Bourdon type. While its releasable connection to the mounting bracket 3 permits the gauge to be removed, as necessary, for repair or replacement, the bracket 3 is designed for permanent installation for mounting the original or a replacement gauge and permanently connecting the latter to the pressure to be gauged.

If desired, the gauge assembly 1 may be used for indicating the pressure in a single fluid pressure line. However, it is particularly advantageous for simultaneously indicating or gauging the pressures in a pair or plurality of pressure lines (not shown) and has been so illustrated as exemplary of the invention. Thus, in the illustrated embodiment, the gauge 2 is a duplex gauge, having as pressure-responsive indicators a pair of hands 4 conventionally mounted on concentric shafts 5 linked to an associated pair of Bourdon tubes (not shown), and a dial or face 6 scaled or calibrated for the pressure range for which the gauge is designed. The tubes are suitably fixed at the bottom to a base 7 having therein a pair of spaced passages or passageways 8, each leading, usually downwardly, from one of the tubes toward the mounting bracket 3.

Enclosing the mechanism of the gauge 2 but leaving a lower part of the base 7 thereof exposed, is a case 9 having a removable cover or faceplate 10, the latter preferably magnifying and formed by a glass lens 11 permanently molded in and integral with a rim 12 releasably and suitably slidably fitting over the otherwise open front end (not shown) of the case's body 13. In the preferred gauge, both the rim 12 and body 13 are made of transparent, substantially relatively unbreakable or breakage-resistant plastic, such as "Lexan," and the cover plate 10 is conveniently held in place by a double-armed spring clip 14 pivoted to the back of the body 13 concentric with the shafts 5 and normally engaging or clipped to opposite sides of a peripheral ridge 15 on the rim 12 and disengageable therefrom simply by applying inward pressure to its arms 16. Projecting or outstanding radially from the balance of the rim 12, the peripheral connecting ridge 15 desirably is interrupted at 90° or other suitable intervals around the rim by correspondingly spaced flats 17 for enabling a plurality of the assemblies to be mounted abreast or in juxtaposition, with minimum lateral clearance therebetween, in a common mounting frame or panel 18 in the manner illustrated in FIG. 1.

As befits the illustrated duplex gauge 2, the mounting bracket 3 is adapted to connect each of the passages 8 in the base 7 of the gauge to one of the pair of fluid pressure pipes or lines (not shown), whose pressures the gauge is to indicate. For that purpose, the mounting bracket 3 has in a unitary or one piece body 19 a pair of laterally spaced outlet ports 20, each leading toward and alignable with one of the gauge passages 8 and, for each outlet port, an inlet port 21. Each inlet port 21 leads and is connectable to one of the pair of pressure pipes, suitably through a pipe fitting (not shown) threaded into a socket 22 in the bottom of the body 19. The outlet and inlet ports 20 and 21 associated with each gauge passage 8, open inwardly at axially spaced positions, the outlet port forward of the inlet port, onto one of a pair of laterally or radially spaced bores or apertures 23 extending longitudinally through the body. Like the single central bore or aperture of the individual gauge fitting disclosed and described in detail in my copending application Ser. No. 767,631, filed Oct. 15, 1968, each bore 23 is threaded at both ends for receiving at the rear a cap 24 and normally receiving at the front a plug 25 and contains, in a valve chamber 26 in a rear part thereof onto which the inlet port 21 opens, a shuttle valve or shuttle 27 spring-urged forwardly to close that port, but normally pressed rearwardly by the plug to hold the port open. Thus, as in that application, the shuttle valve 27 will automatically close the inlet port 21 and thereby shut, cut off or close the outlet port 20 from line pressure when the plug 25 is removed and enable the outlet port to be subjected or exposed, instead, to testing pressure on insertion in place of the plug of a special testing probe (not shown), such as shown in that application, which, as opposed to the plug, does not project or extend rearwardly into the valve chamber 26.

Rather than connecting the base 7 of the gauge 2 directly to the mounting bracket 3, the gauge preferably is both fluid and mechanically connected to the mounting bracket through a spring plate 28 interposed therebetween and suitably screwed or otherwise releasably secured to the base. An integral part of the gauge 2, the preferred gauge base 7 is a rectangular block rigid with or fixed to the gauge tubes and having a flat bottom 29 and front and rear sides 30 disposed parallel to the dial 6 of the gauge. Also generally rectangular, the spring plate 28 conveniently is coextensive endwise with the base, but projects, extends or outstands laterally beyond the base sides 30 and presents or has therebeyond upwardly bowed or bent sides 31. Preferably counterpart, the projecting sides 31 also preferably are formed by or have a center finger or catch 32 sandwiched between or bracketed by and spaced by slotting from a pair of side fingers or catches 33. Shorter or of less projection both outwardly and upwardly than the related center finger 32, the side fingers 33 of each side are adapted for interlocking engagement with inturned or instanding flanges or latches 34 of a spring clamp 35 screwed or otherwise fixed or secured to the back of the mounting bracket 3 and projecting upwardly thereabove sufficiently to receive or accommodate the side fingers between the inturned flanges and a suitably flat upper surface 36 on the top of the bracket. For enabling them to engage or grip the side fingers 33 on either side 31 of the spring plate 28 without engaging the associated or adjoining center finger 32, the flanges 34 are laterally spaced or separated by a center gap 37 in the spring clamp 35 of sufficient width to receive or accommodate the center finger.

With either side clampable to the back of the mounting bracket 3 by the fixed spring clamp 35, the spring plate 28 has its opposite side releasably clampable to the front of the mounting bracket 3 by a movable clamp or latch member engageable with the adjoining center finger 32 and capable by pulling thereagainst of drawing the spring plate downwardly toward and finally into locked position against the top of the mounting bracket 3. Having these capabilities, the illustrated clamping member 38 is of a type having a pair of hinged arms, one 39, screwed or otherwise secured to and projecting below the front of the mounting bracket 3 between the bores 23, and the other 40 hinged for vertical swinging to the bottom of the secured arm and mounting for relative longitudinal sliding a latch plate or latch 41 and an actuating cam 42 for both longitudinally moving or projecting and retracting the latch plate and locking the latter in retracted position. The cam 42 has for manual actuation a suitably flat folding handle 43 pivotally connected thereto and in the locking position of the latch 41 foldable downwardly against the outer arm. For turning or screwing into and out of the related bore 23, each front plug 25 has on its outer end a knurled knob 44, which, when the handle and the latch member's outer arm 40 and the diameter of the knob and size and configuration of the handle are such as to lock the handle and therethrough the cam 42 and latch 41 against movement to release position while either plug is in place. With each shuttle valve 27 in open position for transmitting line pressure between the adjoining inlet and outlet ports 21 and 20 only when its plug is in place and automatically shifting to closed position on removal of the plug, the gauge 2 is automatically cut off from line pressure both when it is released for removal and when it is being tested.

For establishing a fluid connection or communication between each outlet port 20 and the related inlet passage 8 in the gauge base 7, the spring plate 38 is apertured, as at 45, centrally of its sides 31 or along its longitudinal centerline to receive a short or stub connecting tube 46 and a surrounding rubber or like sealing grommet or gasket 47. Double-faced and projecting beyond opposite or upper and lower faces of the spring plate 28, each grommet suitably is peripherally grooved for positioning in its aperture 45, while each connecting tube 46 not only projects substantially beyond both faces of the related grommet, but if, as preferred, it is a rollpin, exerts an outward radial force which effectively holds both itself and the grommet in position and against rotation or turning relative to the spring plate. The opposite ends of each rollpin or other tube 46, when the gauge 2 is clamped to the mounting bracket 3, fit in a pair of aligned cylindrical sockets 48 in the confronting surfaces of the gauge base 7 and mounting bracket, of which the socket in the mounting bracket is connected or open to the outlet port 20 and the socket in the base is connected to the inlet passage 8. Surrounded at its opening onto one or another of the confronting surfaces of the base and mounting bracket 3 by part of the flat surface 29 or 36 thereof, the confronting pair of sockets 48 are effectively sealed by the double-faced grommet 47 against leakage past the related connecting tube 46, whether the latter is a continuous-walled tube or a longitudinally split rollpin, and despite the minor slop or looseness in the fit of the tube, particularly in the socket in the bracket, required for the limited swinging or hinging of the spring plate 28 against the clamping flanges 34 needed in clamping and unclamping the gauge.

Constructed in the above manner, the improved gauge assembly 1 not only is installable alone or with one or more like assemblies in a suitable frame or panel 18, such as illustrated in FIG. 1, but requires for the installation only the mounting of the mounting bracket 3 on the frame and the connection to the bracket of the pressure line or lines to be gauged. Both the mounting of the mounting bracket 3 on the frame and its connection to one or more pressure lines ordinarily will be permanent and, as explained above, the assembly requires no pipe fittings except for connecting the mounting bracket to any pressure line.

Possessing the capability of the gauge fitting disclosed in my application Ser. No. 767,631, of locking the gauge 2 against release or removal while the plug or plugs 25 are in place and the gauge consequently connected or exposed to line pressure, by the overlap of the then folded clamp handle 43 by each plug knob 44, the improved gauge assembly, for a duplex or plural gauge, enables the single line fittings disclosed in that application to be replaced by the assembly's single or one mounting bracket and with duplication therein of the fluid connections and valving, but not of the mechanical connection between it and the gauge.

The spring plate 28 interposed between the gauge 2 and the mounting bracket 3 not only serves as a mechanical and fluid connector or connecting element between those members, but, as part of the mechanical connection, is designed to act as a spring, which, by yieldably resisting clamping of the gauge to the bracket, ensures against any slack in the connection despite manufacturing tolerances and wear. In so acting, the fingers 32 and 33 of the spring plate 28 act as spring catches, the disposition of which, vertically or normal to the confronting surfaces 29 and 36 of the base 7 and mounting bracket 3, relative to the fixed gripping or latch flanges 34 and the retracted or locking position of the slide latch 41, is such that the engaged fingers are flexed or bent downwardly from their normal positions and thereby exert a spring force urging the base and mounting bracket toward each other when the gauge is locked to the bracket.

As the plate sides 31 are counterparts or duplicates and the connecting tubes 46 are centered therebetween, the gauge is lockable to the mounting bracket 3 with its dial 6 and the front of the mounting bracket 3 to which the plugs 25 and clamping member 38 are applied, facing in the same or opposite directions. With the gauge and mounting bracket 3 so relatively reversible, the gauge assembly can readily be mounted in the frame 18 for servicing from either the front or the back thereof, according to the direction in which the bracket is disposed when secured to the frame, and, since in either disposition the gauge and bracket are lockable against relative movement, no direct attachment of the gauge to the frame is required to prevent relative movement therebetween in the locked position of the gauge. The relative reversibility applying also to the spring plate 28 and the gauge base 7 and only the center finger 32 on one and side fingers 32 on the other side of the plate being engaged by the fixed and movable latches 34 and 41 in a given mounting of the gauge, should any of the fingers of this set break, an emergency repair can readily be made simply by removing the gauge and reversing the plate thereon to present the other set of fingers, now in the original disposition of the broken set, for engagement by the latches.

Tools are required for connecting the mounting bracket 3 to the frame 18 and the one or more air lines to be gauged, as well as for the above-described emergency repair following breakage of a finger 32 or 33 of one of the sets. However, none are needed in connecting or disconnecting the gauge and mounting bracket 3 or in the periodic testing of the gauge, since the plugs 25, replacement testing probes (not shown) and latch cam 42 all are adapted for direct manual actuation. Too, in applying the gauge to the mounting bracket, the connecting tubes 46 projecting downwardly from the spring plate 28 conveniently serve with the sockets 48 therefor in the mounting bracket, as positioning devices for correctly aligning the gauge and mounting bracket before they are clamped together.

From the above detailed description it will be apparent that there has been provided an improved pressure gauge assembly, wherein a gauge is releasably clamped to a mounting bracket, all permanent connections are to the bracket and the bracket is so valved as to enable the gauge to be locked against removal except when the gauge is cut off from line pressure. It should be understood that the described and disclosed embodiment is merely exemplary of the invention and that all modifications are intended to be included that do not depart from the spirit of the invention and the appended claims.

I claim:

1. A pressure gauge assembly comprising a mounting bracket member permanently connectable to pressure line means to be gauged, a gauge member, means on one of said members for releasably clamping said gauge member to said bracket member, and means including tube means mounted against relative rotation on one of said members and receivable in the other member for sealingly connecting said members for passage of fluid therebetween.

2. A pressure gauge assembly according to claim 1, including spring means acting between said members for urging said members together on clamping of the gauge member to the bracket member.

3. A pressure gauge assembly according to claim 2, wherein the spring means is a spring plate releasably secured to the one member and mounting the tube means, and including sealing gasket means seated in said plate about said tube means and engaging confronting surfaces of the members for sealing therebetween on clamping of the gauge member to the bracket member.

4. A pressure gauge assembly according to claim 3, wherein the spring plate is secured to the gauge member and including spaced fixed and projectable latch means mounted on the bracket member and spring catch means on opposite sides of the spring plate and engageable by said latch means for releasably clamping the gauge member under spring pressure to the bracket member.

5. A pressure gauge assembly according to claim 1, wherein the gauge member is a plural gauge having a plurality of pressure responsive means for simultaneously gauging a plurality of pressures, the bracket member is separately connected to a plurality of pressure lines and has therein a plurality of separate passages each leading from one of said lines toward a surface of the bracket member confronting the gauge member on clamping thereof to the bracket member, and the tube means are a plurality of separate tubes each connectable to one of said passages for transmitting pressure therefrom to one of said pressure responsive means.

6. A pressure gauge assembly according to claim 1, wherein the gauge member has a case including a removable magnifying cover plate, and said cover plate is formed of a glass lens molded in a plastic rim.

7. A pressure gauge assembly according to claim 4, wherein the gauge member is a plural gauge having a plurality of pressure responsive means for simultaneously indicating a plurality of pressures, the bracket member is separately connnected to a plurality of pressure lines and has a plurality of passages therein each leading from one of said lines toward a surface thereof confronting said plural gauge on clamping thereof to the bracket member, and the tube means are a plurality of separate tubes each connectable to one of said passages for transmitting pressure therefrom to one of said pressure responsive means.

8. A pressure gauge assembly according to claim 7, wherein the catch means at opposite sides of the spring plate are counterparts, the catch means at each side includes a center catch engageable with the projectable latch means and side catches engageable with the fixed latch means, and the tubes are centered laterally on the spring plate, whereby the gauge is reversibly clampable to the bracket member and by reversal of the spring plate on the gauge a set of unbroken catches is presentable for engagement by the fixed and projectable latch means on breakage of a catch of the set previously engaged by said latch means.

9. A pressure gauge assembly according to claim 7, including in the bracket member a plurality of spaced apertures each interrupting one of the passages therein, valve means in each aperture and spring-urged for shutting off transmission therethrough and the related passage of pressure from one of the pressure lines to the gauge, plug means normally inserted in each aperture from an end of the bracket means mounting the projectable latch means and acting on the valve means in said aperture for holding the related passage open, cam means for actuating the projectable latch means, and having an operating handle and a knob on each plug and normally overlapping said operating handle for locking the projectable latch means in retracted position and the gauge against release from the bracket member except on removal of the plugs and closing of the passages by the valve means.

10. A preserve gauge assembly according to claim 3, wherein each tube means is a rollpin.